(12) United States Patent
Layman

(10) Patent No.: US 7,073,462 B1
(45) Date of Patent: Jul. 11, 2006

(54) ORGANIZER FOR TAKING DOGS FOR WALKS

(76) Inventor: Jeremy Layman, 7727 Germantown Ave. Apt 204, Philadelphia, PA (US) 19118

( * ) Notice: Subject to any disclaimer, the term of this patent is extended or adjusted under 35 U.S.C. 154(b) by 0 days.

(21) Appl. No.: 11/009,784

(22) Filed: Dec. 11, 2004

(51) Int. Cl.
*A01K 23/00* (2006.01)
*A01K 29/00* (2006.01)

(52) U.S. Cl. .................................. 119/161; 119/867
(58) Field of Classification Search ............... 119/795, 119/496, 497, 867, 161, 796; D30/162; 383/38, 383/40, 41, 103; 206/233, 223, 541; 224/162, 224/660, 664
See application file for complete search history.

(56) References Cited

U.S. PATENT DOCUMENTS

| | | | | |
|---|---|---|---|---|
| 2,522,391 A | * | 9/1950 | McGonigle | 119/453 |
| 4,523,703 A | * | 6/1985 | McKenna | 224/676 |
| 5,447,227 A | | 9/1995 | Koseberg | 206/233 |
| 5,871,280 A | * | 2/1999 | Watters | 383/41 |
| 6,257,473 B1 | | 7/2001 | Ringelstetter | 224/675 |
| D453,067 S | | 1/2002 | Cody | D3/215 |
| 6,701,871 B1 | * | 3/2004 | Johnson | 119/497 |

FOREIGN PATENT DOCUMENTS

| JP | 10004815 | * | 1/1998 |
| JP | 2000316412 | * | 11/2000 |
| JP | 3554932 | * | 8/2004 |

* cited by examiner

*Primary Examiner*—Son T. Nguyen
(74) *Attorney, Agent, or Firm*—Goldstein Law Offices P.L.

(57) ABSTRACT

An organizer for assisting a user when taking a dog for a walk. The organizer has an adjustable belt with an interlocking buckle and an attached pouch. The pouch has a top lid and front, left and right surfaces. The lid closes by means of a top zipper. A hook for tethering the dog is permanently affixed to the left surface. The user can insert a box of plastic bags in a bag compartment inside a side zipper in the left surface and dispense the bags through an elongated slot in the front surface to collect dog waste. Also, the pouch has separate compartments for a leash and other accessories. A solar energy panel is located on the lid and is in communication with a light-emitting diode. The diode can either be activated by opening the lid or via a switch mounted onto the right surface.

3 Claims, 3 Drawing Sheets

FIG. 1

ORGANIZER FOR TAKING DOGS FOR WALKS

BACKGROUND OF THE INVENTION

1. Field of the Invention

The invention generally relates to organizers, and in particular it relates to an organizer that conveniently stores items commonly carried by an owner when taking his dog for a walk.

2. Description of the Related Art

It is an undeniable truth that America is a country of dog lovers. According to the American Pet Products Manufacturers Association, there are approximately sixty-eight million owned dogs in the United States. About four out of every ten households include family dogs. The enormous popularity of dogs, widely known as "man's best friends", can be attributed to various factors. First, dogs frequently provide unconditional love, steady companionship and unmatched loyalty to their owners. Certain breeds of dogs also offer protection and an accompanying sense of security. For many owners, curling up on a comfortable sofa or chair with a beloved dog nestled nearby constitutes a favorite end to a hectic day. Since they usually consider them de facto family members, and not merely pets, most owners provide their dogs with adequate shelter and a healthy diet.

In addition, owners generally take their dogs for a leisurely or fast-paced walk. Involving breathing in fresh air, stretching the body with some light exercise and enjoying the sights and sounds of new surroundings, such walks can serve as revitalizing experiences for owners and dogs alike. Most dogs, whether expensive thoroughbreds purchased from a top-notch breeder or mixed-breed "mutts" picked up at the local pound, relish going for walks. In fact, many dogs instinctively run for the door as soon as they see their masters grasping their leashes. When taking their dogs for walks, most owners carry a small arsenal of goods which are needed along the way. Some of the items that a typical owner often brings include: plastic bags for gathering dog waste, a small ball for a spirited game of catch, various treats that are offered to the dog as rewards for good behavior and a leash.

However, physically carrying and storing these goods when walking the dog often presents considerable difficulty for the owner. Initially, gathering all of the necessary goods in a single location before departing for the walk is often a time-consuming and unpleasant task. Furthermore, while being transported, the items can easily fall out of the hands of the owner and/or bulge greatly from coat or pants pockets. This precarious handling and storage of objects can significantly detract from the overall enjoyment experienced by the owner. Hence, there is a pressing need for an organizer that conveniently stores numerous items that are currently carried by owners while taking their dogs for routine walks.

U.S. Design Pat. No. US D453,067 S to Cody ("Cody") teaches an ornamental design for a pet waste kit. However, a kit having the design of Cody would be of minimal use to an owner who takes his dog for a walk since it does not provide means of storing necessary items.

U.S. Pat. No. 5,447,227 to Koseberg ("Koseberg") discloses a device for carrying pet supplies. However, the device of Koseberg is bulky and thus likely uncomfortable to wear while walking a dog.

U.S. Pat. No. 6,257,473 B1 to Ringelstetter ("Ringelstetter") teaches a sanitary collection holder for animal waste. However, the sanitary collection holder of Ringelstetter has limited application and is overly complex.

While these devices may be suitable for the particular purposes employed, or for general use, they would not be as suitable for the purposes of the present invention as disclosed hereafter.

SUMMARY OF THE INVENTION

It is an object of the invention to provide an organizer that can be comfortably and securely worn by a user while taking his dog for a walk. Accordingly, the organizer has a pouch. An adjustable belt with an interlocking buckle is attached to opposing sides of the rear surface of the pouch.

It is another object of the invention to provide an organizer that can store accessories commonly carried by a user when taking his dog for a walk. Accordingly, the pouch contains separate compartments for dog toys and treats, a leash and a roll of plastic bags.

It is a further object of the invention to provide means of readily accessing the objects stored inside the organizer. Accordingly, the user can quickly unzip and lift the top lid of the pouch.

It is a further object of the invention to provide an organizer that allows the user to quickly unravel and deploy a stored leash. Accordingly, there is an opening in the right surface of the pouch through which the user can feed and retract the leash.

It is a further object of the invention to provide means of tethering the dog to the organizer to allow the user to have both hands free when needed or desired. Accordingly, a heavy-duty hook is permanently attached to the left surface of the pouch.

It is a further object of the invention to provide an organizer that includes means of cleaning up dog waste. Accordingly, a user can dispense plastic bags through a slot in the front surface of the pouch.

It is a further object of the invention to provide an organizer that can be utilized as effectively at night and in dark places as in sunlight. Accordingly, a solar energy panel on the upper surface of the top lid of the pouch is in electrical communication with an internal light-emitting diode.

The invention is an organizer for assisting a user when taking a dog for a walk. The organizer has an adjustable belt with an interlocking buckle and an attached pouch. The pouch has a top lid and front, left and right surfaces. The lid closes by means of a top zipper. A hook for tethering the dog is permanently affixed to the left surface. The user can insert a box of plastic bags in a bag compartment inside a side zipper in the left surface and dispense the bags through an elongated slot in the front surface to collect dog waste. Also, the pouch has separate compartments for a leash and other accessories. A solar energy panel is located on the lid and is in communication with a light-emitting diode. The diode can either be activated by opening the lid or via a switch mounted onto the right surface.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
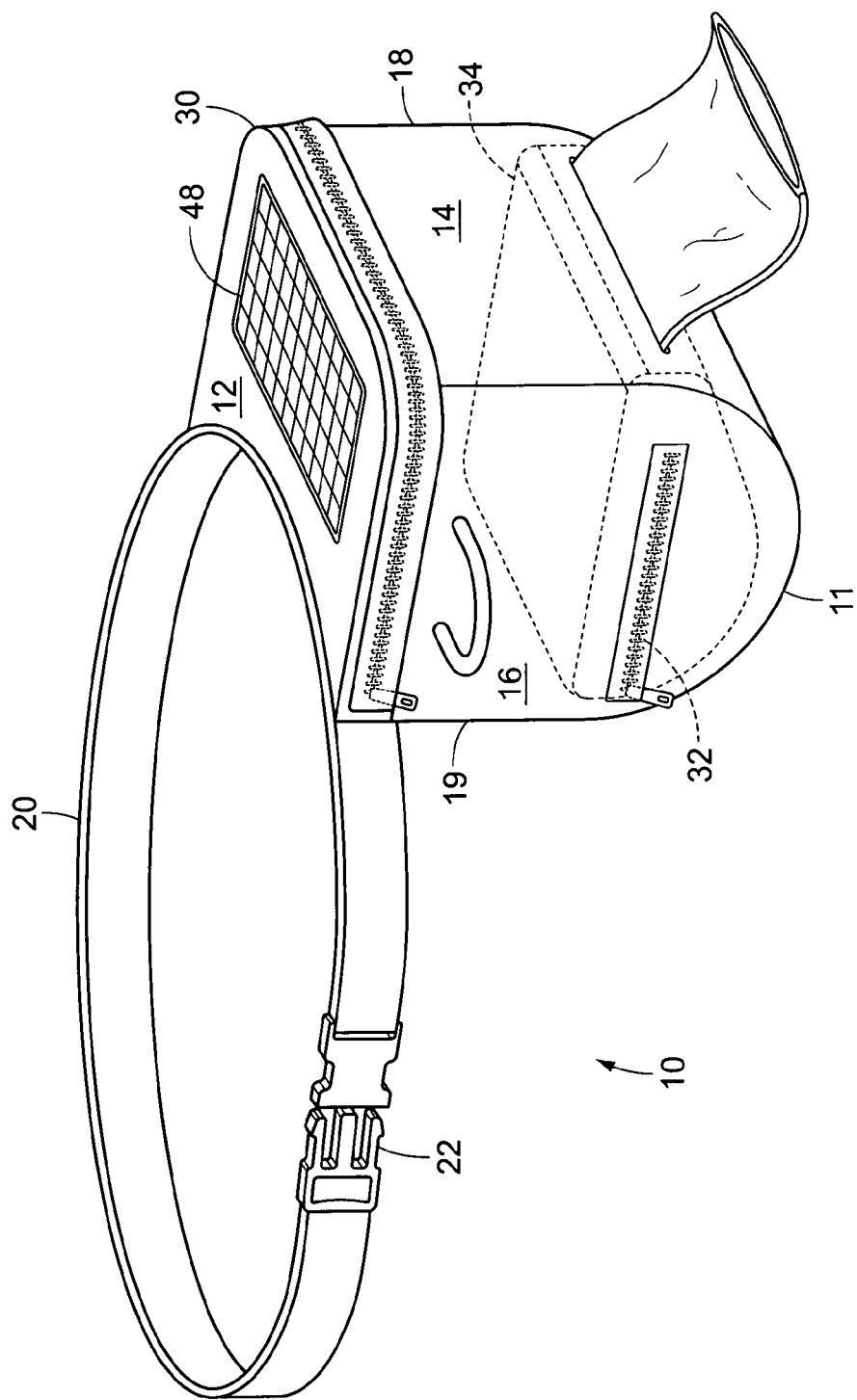
FIG. 1 is a left side perspective view of an organizer according to the present invention with a bag compartment therein represented by hidden lines. The organizer is in a closed position.

FIG. 1 depicts an organizer 10 according to the present invention in a closed position. The organizer 10 is specially designed to be employed by a dog owner while taking his dog for a routine walk. Structurally, the organizer 10 has a pouch 11 with a top lid 30, a front surface 14, a left surface 16, a right surface 18 and a rear surface 19. The lid 30 is generally rectangular while the front surface 14, the left surface 16, the right surface 18 and the rear surface 19 are irregularly shaped, have rounded edges and form a curved bottom. An adjustable belt 20 with an interlocking buckle 22 is attached to opposing sides of the rear surface 19 of the pouch 11. This configuration allows a user to comfortably wear the organizer 10 as he would wear a conventional fanny pack—with the belt 20 snugly secured around his waist and the pouch 11 resting flatly against his stomach or his sides.

Figure 2:
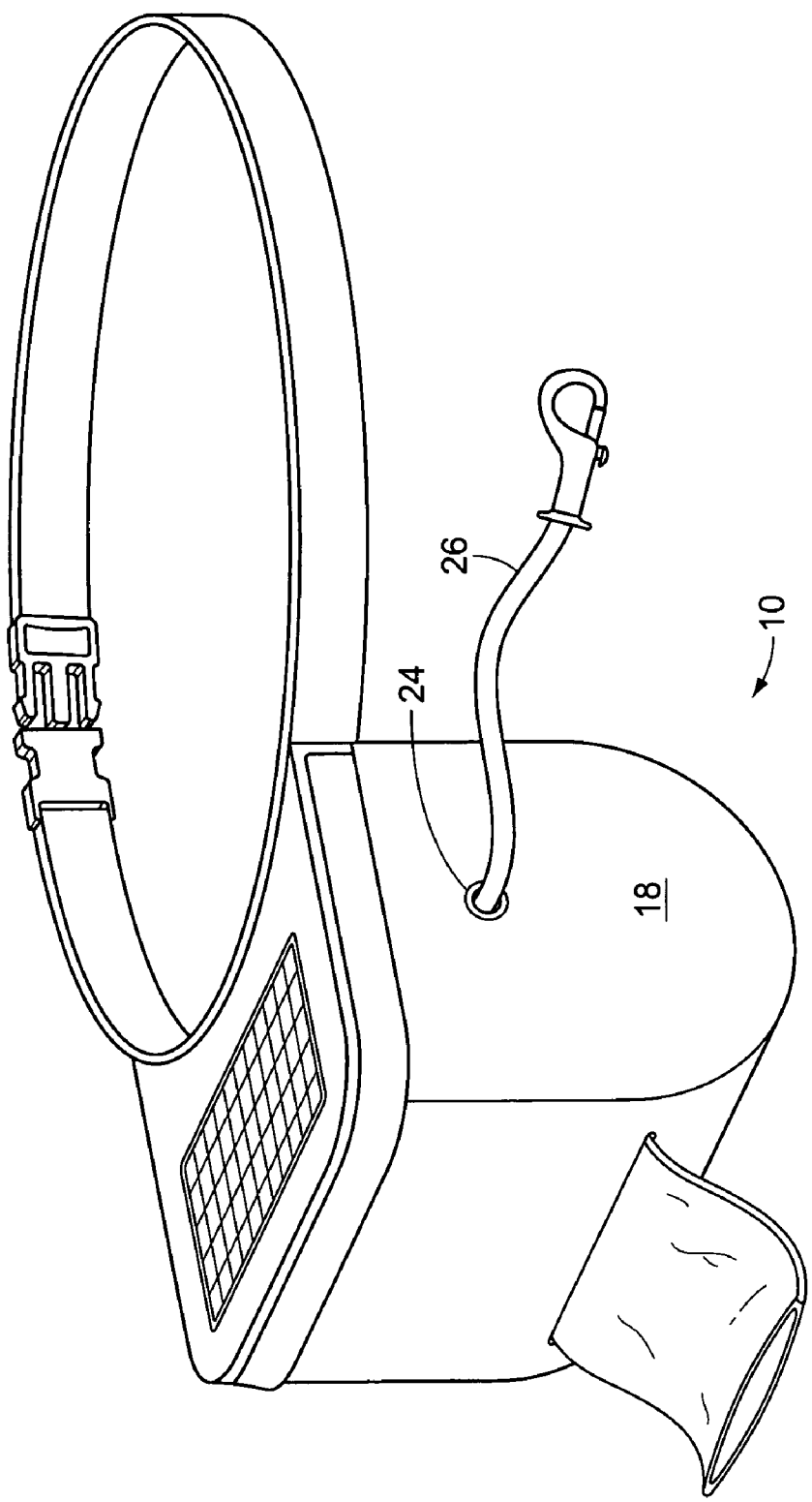
FIG. 2 is a right side perspective view of the organizer in a closed position.
Figure 3:
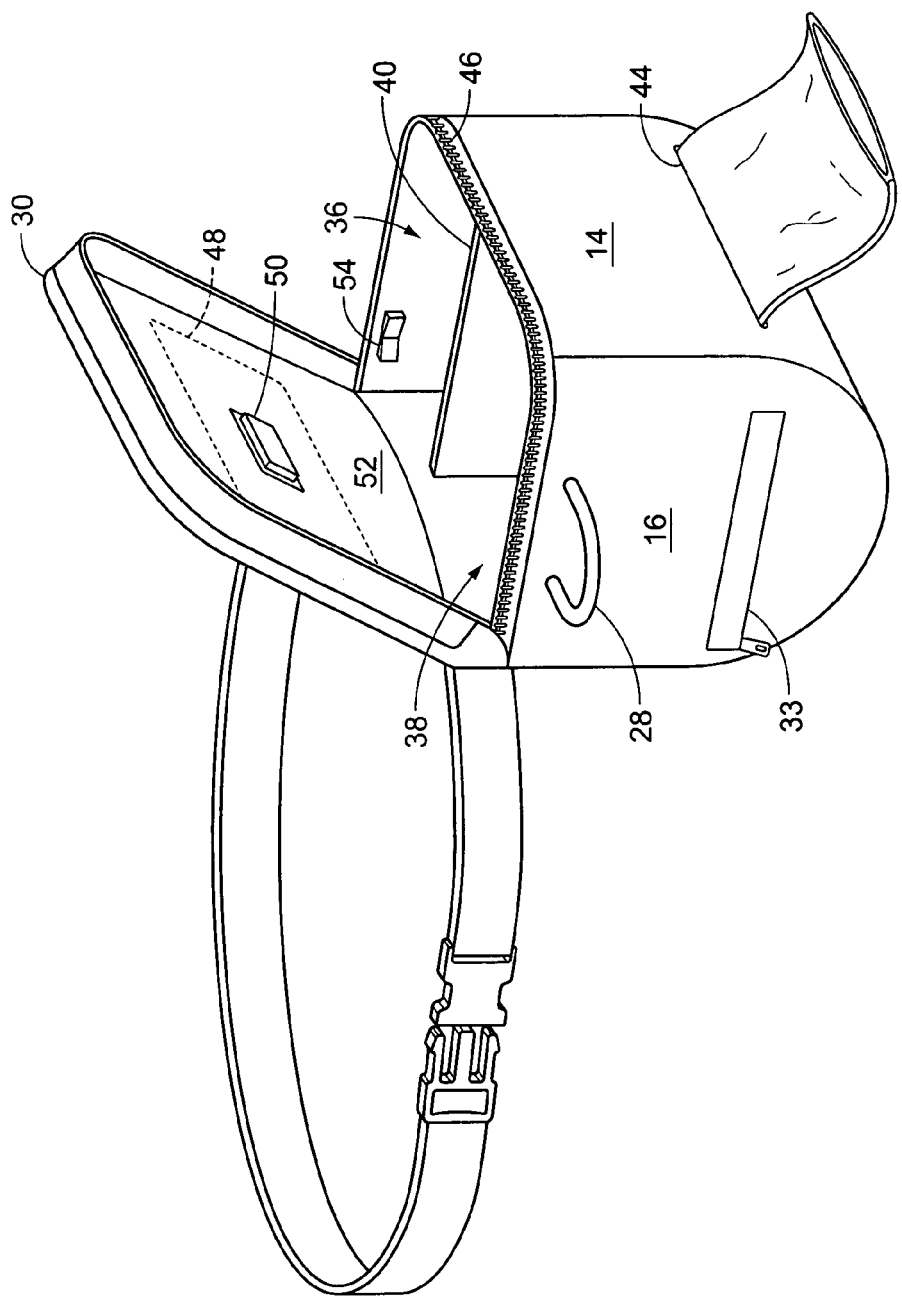
FIG. 3 is a left side perspective view of the organizer in a partially open position.

One of the objects that are most commonly carried by a user while taking his dog for a walk is a leash. As shown in FIG. 2, there is a circular opening 24 in the right surface 18 of the pouch 11. A retractable dog leash 26 is positioned inside the pouch 11 and extends through the opening 24. Before leaving home, the user can pull on the leash 26 to unwind it to its full length and then attach it to the collar or harness of the dog. At the conclusion of the walk, or at another desired time, the user can detach the leash from the dog and allow it to retract into the pouch 11. In addition, as illustrated in FIG. 3, a heavy-duty semi-circular hook 28 is permanently affixed to the left surface 16 near the top thereof. Whenever the user needs or desires to have both hands free, such as when employing other features of the organizer 10 or tying his sneakers, he can tether the dog to the pouch 11 by firmly securing the leash to the hook 28. When the user wishes to resume walking the dog as before, he simply unties the leash and grasps it. The hook 28 thereby affords the user considerable freedom of movement and allows him to accomplish other important tasks during the walk.

Referring back to FIG. 1, a side zipper 32 extends across the width of the left surface 16 and opens into a bag compartment 34 inside the pouch 11. The side zipper 32 is normally shielded from view by a flap 33, shown in FIG. 3, made of fabric. The bag compartment 34 holds a box of plastic bags for collecting dog waste during the walk. The bags are dispensed through an elongated slot 44 in the front surface 14. In order to collect waste from his dog as required by numerous local ordinances and regulations across the country, the user lifts the flap 33, opens the side zipper 32, inserts a box of bags into the bag compartment 34, aligns the box with the slot 44, pulls a first bag through the slot 44, closes the side zipper 32 and lowers the flap 33. During the walk, the user simply pulls bags out of the box through the slot 44 as necessary, collects the dog waste with the bags and disposes of the bags in an appropriate manner. This technique ensures the efficient removal of dog waste from public areas without utilizing an instrument that must be carefully cleaned later.

A horizontal wall 42 separates the bag compartment 34 from other components inside the pouch 11. Above the horizontal wall 42 are a leash compartment 36 and an adjoining accessories compartment 38, which are separated by a vertical wall 40. The leash compartment 36 holds the folded leash 26 and is relatively small. The user can also place other items in the leash compartment 36 as long as they do not physically entangle or damage the leash 26. The accessories compartment 38 is relatively large and therefore can store a wide variety of objects taken by a user when walking his dog, including a small ball and various treats for the dog and a flashlight for the user. In order to access the leash compartment 36 and the accessories compartment 38, the user must first open a top zipper 46 that separates the lid 30 from the front surface 14, the left surface 16 and the right surface 18.

Moreover, a generally rectangular solar energy panel 48 is present on an outer surface 12 of the lid 30. The panel 48 stores energy from natural or artificial light and transmits it to a light-emitting diode ("LED") 50 positioned on an inner surface 52 of the lid 30. The LED generates enough electrical power to fully illuminate the leash compartment 36 and the accessories compartment 38. The user can activate the LED 50 in dark surroundings in one of two ways. First, the LED 50 can be configured to automatically turn on when the lid 30 is lifted and automatically turn off when the lid 30 is closed again. Alternatively, a switch 54 can be mounted onto the right surface 18 and utilized to selectively activate and deactivate the LED 50. In this way, the user can effectively employ the organizer 10 in darkness as well as in light.

In conclusion, herein is presented an organizer for storing accessories that are commonly employed by a user when taking his dog for a walk. The invention is illustrated by example in the drawing figures, and throughout the written description. It should be understood that numerous variations are possible, while adhering to the inventive concept. Such variations are contemplated as being a part of the present invention.

What is claimed is:

1. An organizer for assisting a user when taking a dog for a walk, comprising an adjustable belt with an interlocking buckle and a pouch, the belt being attached to the pouch and secured around a waist of the user before the walk, the pouch having a top lid having an inner surface and outer surface, the pouch having, a front surface, a left surface and a right surface, the front surface having an elongated slot for dispensing plastic bags used to collect waste of the dog, the left surface having a side zipper that is selectively openable into a bag compartment inside the pouch for holding the bags, the side zipper being covered by a fabric flap, the pouch having a leash compartment for holding a leash that is selectively extendable and retractable through a circular opening in the right surface, the leash compartment separated from the bag compartment by a horizontal wall, the pouch also having an accessories compartment for holding various accessories employed by the user during the walk, the accessories compartment being separated from the leash compartment by a vertical wall, the accessories compartment being separated from the bag compartment by the horizontal wall, wherein the lid is separated from the front surface, the left surface, and the right surface by a top zipper, the top zipper being selectively openable into the accessories compartment and the leash compartment, wherein a solar panel is located on the outer surface of the lid, and wherein a light emitting diode is located on the inner surface of the lid in electrical communication with the solar panel.

2. The organizer as recited in claim 1, wherein the diode automatically turns on when the lid is in an open position and turns off when the lid is in a closed position.

3. The organizer as recited in claim 1, wherein a switch is mounted onto the right surface, the switch being used to selectively activate and deactivate the diode.

* * * * *